(12) United States Patent
Pintat

(10) Patent No.: US 11,352,752 B2
(45) Date of Patent: Jun. 7, 2022

(54) ARTIFICIAL TURF INFILL MATERIAL

(71) Applicant: Benoit Pintat, Zellenberg (FR)

(72) Inventor: Benoit Pintat, Zellenberg (FR)

( * ) Notice: Subject to any disclaimer, the term of this patent is extended or adjusted under 35 U.S.C. 154(b) by 0 days.

(21) Appl. No.: 16/618,479

(22) PCT Filed: May 29, 2018

(86) PCT No.: PCT/EP2018/064116
§ 371 (c)(1),
(2) Date: Dec. 2, 2019

(87) PCT Pub. No.: WO2018/219974
PCT Pub. Date: Dec. 6, 2018

(65) Prior Publication Data
US 2020/0181852 A1    Jun. 11, 2020

(30) Foreign Application Priority Data
Jun. 2, 2017   (EP) .................................. 17174275

(51) Int. Cl.
*E01C 13/08* (2006.01)
*B01J 20/16* (2006.01)
*E01C 13/02* (2006.01)

(52) U.S. Cl.
CPC ............ *E01C 13/08* (2013.01); *B01J 20/165* (2013.01); *D10B 2505/202* (2013.01); *E01C 13/02* (2013.01); *E01C 2013/086* (2013.01); *E01C 2201/10* (2013.01); *E01C 2201/20* (2013.01)

(58) Field of Classification Search
CPC ...................................................... E01C 13/08
See application file for complete search history.

(56) References Cited

U.S. PATENT DOCUMENTS

| 4,267,073 A | 5/1981 | Nielsen et al. |
| 2012/0258811 A1 | 10/2012 | Tetrault et al. |
| 2014/0193593 A1 | 7/2014 | Daluise |

FOREIGN PATENT DOCUMENTS

| CN | 2493016 Y | 5/2002 |
| CN | 1556886 A | 12/2004 |
| CN | 1676751 A | 10/2005 |
| CN | 101451307 A | 6/2009 |
| CN | 101701443 A | 5/2010 |
| CN | 103322635 A | 9/2013 |
| CN | 205839527 U | 12/2016 |
| EP | 0948988 A1 | 10/1999 |
| KR | 101610679 B1 | 4/2016 |
| RU | 2415166 C2 | 3/2011 |
| RU | 2455416 C2 | 7/2012 |

(Continued)

OTHER PUBLICATIONS

"USGS" U.S. Geological Survey Circular 831, 1980 Chapter 12 Minerals, Ores and Gemstones (Year: 1980).*

(Continued)

*Primary Examiner* — Colin W. Slifka
(74) *Attorney, Agent, or Firm* — Harness, Dickey & Pierce, P.L.C.

(57) ABSTRACT

The invention provides for method for forming an artificial turf infill material. The method comprises selecting from a zeolite ore a microporous zeolite mineral using a selection criterion on specific surface area of the mineral, thereby providing the artificial turf infill material.

13 Claims, 6 Drawing Sheets

(56) References Cited

FOREIGN PATENT DOCUMENTS

| WO | WO-2016/096517 A1 | 6/2016 |
|---|---|---|
| WO | WO-2016204492 A1 | 12/2016 |

OTHER PUBLICATIONS

"Sigma" Particle Size conversion Table, Downloaded Mar. 23, 2021 https://www.sigmaaldrich.com/chemistry/stockroom-reagents/learning-center/technical-library/particle-size-conversion.html (Year: 2021).*

Hong et al, "Top-Down Synthesis of NaP Zeolite from Natural Zeolite for the Higher Removal Efficiency of Cs, Sr, and Ni", Minerals 2021, 11, 252. https://doi.org/10.3390/min11030252 (Year: 2021).*

Webmineral (http://webmineral.com/data/Clinoptilolite-Na.shtml#.Xe501i N KhaQ) accessed Dec. 9, 2019 (Year: 2019).

International Search Report PCT/ISA/210 for International Application No. PCT/EP2018/064116 dated Oct. 17, 2018.

Written Opinion of the International Searching Authority for International Application No. PCT/EP2018/064116 dated Oct. 17, 2018.

International Preliminary Report on Patentability PCT/IPEA/416 for International Application No. PCT/EP2018/064116 dated Sep. 13, 2019.

Anonymous: "Seminar on Adsorption: Specific Surface Area," MicrotracBEL Corp., Nov. 25, 2015, pp. 1-2.

Non-Final Office Action dated Dec. 28, 2020 in U.S. Appl. No. 15/611,894.

Final Office Action dated Jun. 11, 2021 in U.S. Appl. No. 15/611,894.

Office Action dated Apr. 27, 2021 in Russian Application No. 2019138718/03(076351).

Office Action dated May 7, 2021 in Chinese Application No. 201880048282.9.

A.G. Bebi, et al., "Investigation of the sorption properties of zeolites of different levels of occurrence depending on the specific surface of the particles," UDC 533.924; 620.22.8 Bulletin of the Yugorsk State University, Issue 2 (33). pp. 15-23, 2014.

Non-Final Office Action dated Nov. 10, 2021 in U.S. Appl. No. 15/611,894.

Communication pursuant to Article 94(3) EPC dated Nov. 5, 2021 in European Application No. 17174275.2.

Office Action dated Feb. 2, 2022 in Canadian Application No. 3,065,664.

* cited by examiner

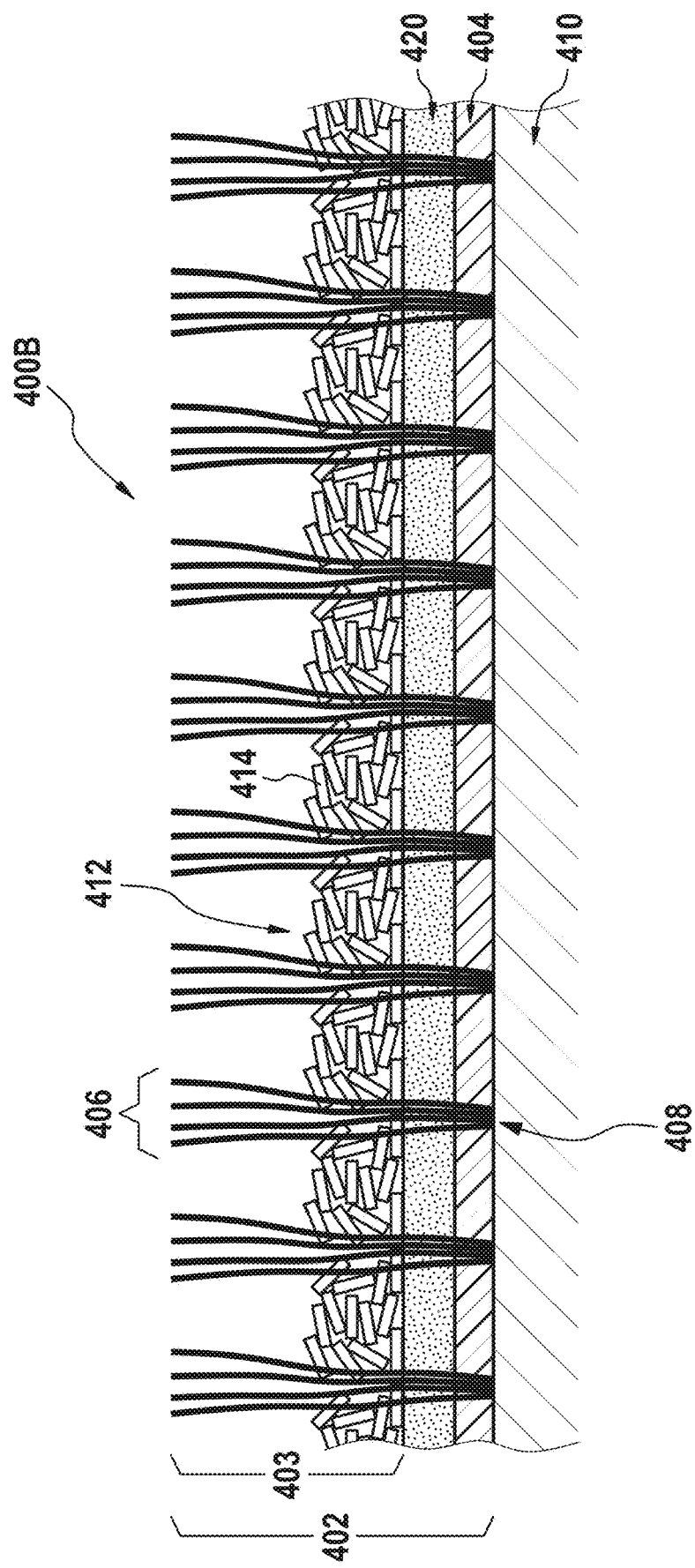

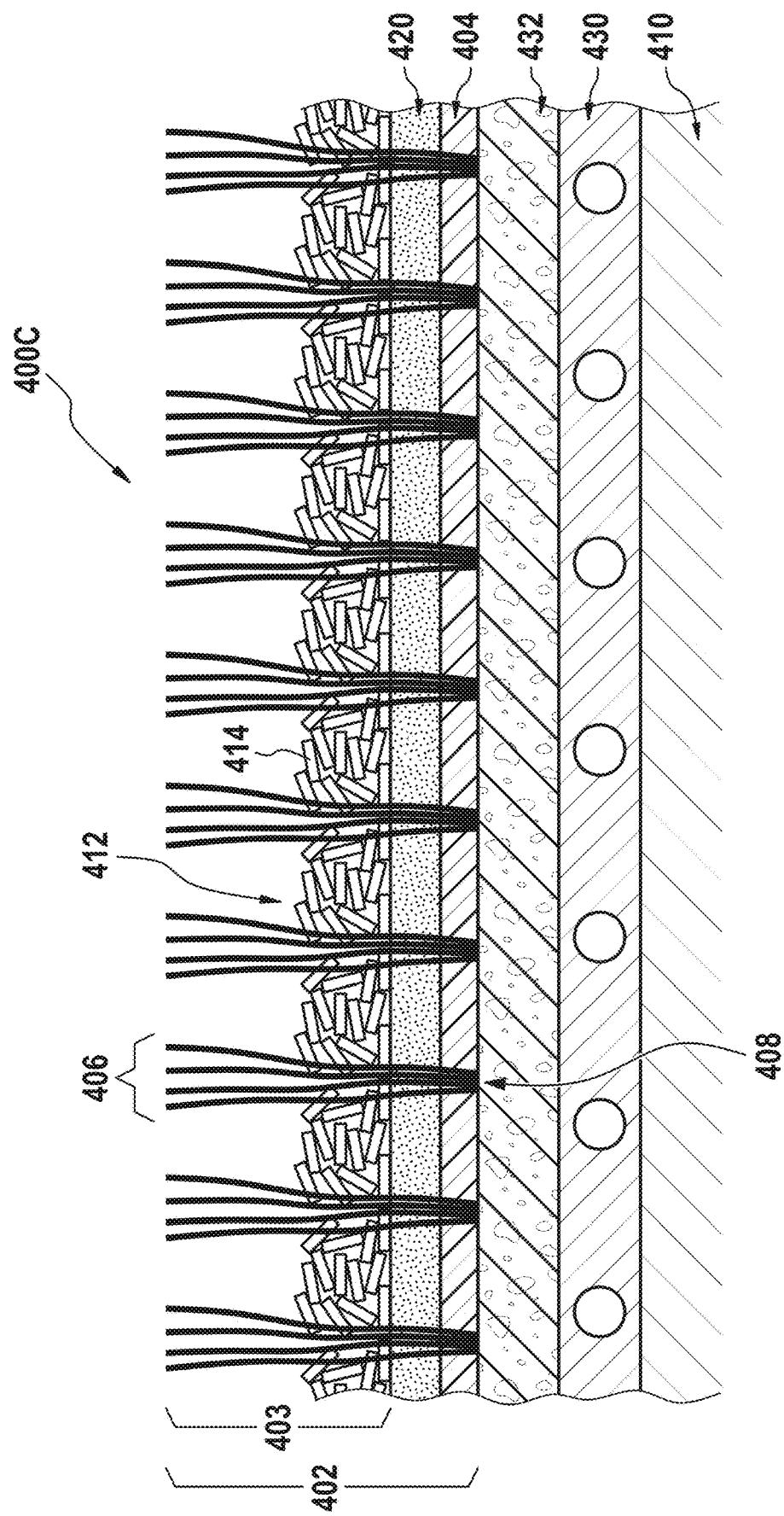

ARTIFICIAL TURF INFILL MATERIAL

CROSS-REFERENCE TO RELATED APPLICATIONS

This application is a national phase under 35 U.S.C. § 371 of PCT International Application No. PCT/EP2018/064116 which has an International filing date of May 29, 2018, which claims priority to European Application No. 17174275.2, filed Jun. 2, 2017, the entire contents of each of which are hereby incorporated by reference.

FIELD OF THE INVENTION

The invention relates to artificial turf, in particular to artificial turf with infill and also infill for artificial turf.

BACKGROUND AND RELATED ART

Artificial turf or artificial grass is a surface that is made up of fibers which is used to replace grass. The structure of the artificial turf is designed such that the artificial turf has an appearance which resembles grass. Typically artificial turf is used as a surface for sports such as soccer, American football, rugby, tennis, golf, for playing fields, or exercise fields. Furthermore artificial turf is frequently used for landscaping applications.

However, there is a need for a method and systems for controlling the temperature at the surface of the artificial turfs. U.S. Pat. No. 9,468,905 B2 discloses a composition for an outside surface of artificial turfs in order to allow for an adsorption and/or desorption effect that optimizes the use of artificial turfs at high temperatures.

SUMMARY

The invention provides for an artificial turf, a method of forming an artificial turf infill and the use of the artificial turf infill in the independent claims. Embodiments are given in the dependent claims.

In some embodiments, a method for forming an artificial turf infill material is provided. The method comprises: providing a zeolite ore; reducing the zeolite ore into smaller zeolite fractions; selecting from the zeolite fractions ore a microporous zeolite mineral, whereby the selection is performed using specific surface area of the mineral as a selection criterion for the selection of the mineral, thereby providing the artificial turf infill material. As a result a portion of the zeolite fractions is selected as the zeolite mineral that is used for the artificial turf infill. In other words, a method for forming an artificial turf infill material is provided. The method comprises: providing a zeolite ore; and selecting from the zeolite ore a microporous zeolite mineral using a selection criterion on specific surface area of the mineral, thereby providing the artificial turf infill material.

The zeolite ore may be a natural material having various porosities depending on the source of the zeolite ore. In accordance with an embodiment of the invention, the zeolite ore from which the zeolite fractions are obtained has a porosity between 15% and 20%, such that the resultant microporous zeolite mineral also has the same porosity in the range between 15% and 20%.

For example, the selection may be performed by sorting by size the grains of the mineral such that the grains having a size higher than a predetermined maximum grain size are rejected or filtered out and the grains having a size bellow the maximum grain size form the microporous zeolite mineral.

The artificial turf may be used for a number of applications such as sporting venues, landscape applications and green roofs on buildings. However, on playing fields, for example, the outside surfaces of the artificial turf are subject to the constraints of bad weather and temperature variations that lead to problems in maintaining these outside surfaces in the conditions optimal for use. In order to solve such a problem, the present method provides a purposive selection of the zeolite mineral. This may enable to address specific purposes of the use of the artificial turf infill, wherein such purposes can be controlled via the specific surface area. One example purpose is to enable the use of artificial turfs within the framework of bad weather and high temperatures.

The determination of the specific surface area of the mineral is particularly relevant for monitoring industrial processing of the zeolite minerals. The specific surface area constitutes an important criterion that enables the determination of the quality of a zeolite mineral since the nature of the specific surface area enables a decisive characteristic for the overall usage of zeolite. In particular the usage of the selected microporous zeolite mineral as an artificial turf infill may have an impact on how realistically the artificial turf performs.

Artificial turf infill is a material that covers the bottom portion of the artificial turf fibers. The use of artificial turf infill of the present disclosure may further have a number of advantages. For example, artificial turf infill may help the artificial turf fibers stand up straight. Artificial turf infill may also absorb impact from walking or running and provide an experience similar to being on real turf. The artificial turf infill may also help to keep the artificial turf carpet flat and in place by weighting it down.

The selection of the microporous zeolite mineral may for example comprise crushing the zeolite ore for obtaining groups of zeolite materials. The specific surface area of each group of the groups may be determined or measured. Based on the measured specific surface area groups that fulfill the selection criterion may be selected to form the microporous zeolite mineral. The specific surface area may for example be measured by adsorption using the Brunauer, Emmett, and Teller (BET) technique. This may have the advantage of measuring the surface of fine structures and deep texture on the particles.

The selection criterion refers to rules (e.g. classification rules) on the basis of which it may be decided whether the specific surface area of zeolite material is to be selected for forming the microporous zeolite mineral of the present method.

According to one embodiment, the selection criterion comprises: the specific surface area is smaller than a predetermined maximum specific surface area. Without putting an upper limit on the specific surface area, the infill material may comprise an inhomogeneous combination of the zeolite mineral. This embodiment may further be advantageous as it may be simple to implement in particular where mineral production involves repeated processes.

According to one embodiment, the method further comprises determining the maximum specific surface area of the mineral as the surface specific area that enables the water in the mineral to release, under an ambient temperature, at a predefined minimum rate. This embodiment may enable a progressive release of the water by the microporous mineral and thus may avoid rapid evaporation of the water after watering the surface. This may allow a lower temperature to be maintained at the level of the field surface compared to the ambient temperature. For example, the controlled release of water causes progressive cooling under evaporation. Thus the amount of watering usually necessary to refresh a field surface may be reduced.

The present selected grain structure of the mineral enables the formation of bound water surrounding mineral surfaces and maintained by weak force of van der Waals force. This renders the release or desorption of the water easier in particular under ambient temperature (e.g. the solar energy is enough to desorb the water). While the bound water is releasing the water inside the grain may be transferred under ambient temperature to the grain's surface which is then transformed to water vapor. This may enable a progressive release of water over a predefined time period and may enable the cooling of the surface of the artificial turf.

According to one embodiment, the selecting comprises: determining a zeolite grain size corresponding to the maximum surface specific area; providing a grinding unit; reducing the zeolite ore into smaller zeolite fractions; setting parameters of the grinding unit in accordance with the determined grain size; repeatedly grinding and screening the zeolite fractions in the grinding unit for selecting the microporous zeolite mineral. The grain size may refer to the diameter (e.g. maximum diameter) of individual grains.

The repeatedly grinding and screening may comprise repeating the grinding and the screening. In one example, the step of screening may comprise multiple screening. The multiple screenings may be of the same or different type screenings. For example, a screening of the multiple screening may comprise an inclined screening and another screening of the multiple screening may comprise a horizontal screening. Performing multiple screening may enable an optimal dedusting of the resulting microporous mineral.

According to one embodiment, the zeolite fractions have a maximum size between 12 mm and 19 mm.

According to one embodiment, the reducing of the zeolite ore comprises crushing the zeolite ore in a primary crusher, wherein the grinding unit comprises a secondary crusher and a screening unit, wherein the parameters comprise at least one of: the number of decks of the screening unit, the number of times the screening is to be repeated in the screening step; the exciting force causing the vibration of the screening unit; inclined and/or horizontal screening; reduction ratio of the primary and secondary crushers. A high number of parameters enable an optimal control of the grinding unit for providing an efficient production and selection of the microporous zeolite mineral.

According to one embodiment, the method further comprises drying the smaller zeolite fractions in a dryer before the grinding. Dust generated during mineral production activities provides a pathway for the accumulation of contaminants in the surrounding environment. This embodiment may have the advantage of reducing the amount of dust in the resulting microporous zeolite mineral.

According to one embodiment, the method further comprises shaping the microporous zeolite mineral in a predefined shape, wherein the maximum specific surface area is determined based on the solar reflectivity of the zeolite material having the predefined shape. The solar reflectivity depends on the shape of the reflecting object. By controlling the shape of the microporous zeolite mineral, the rate of the water release may be more efficiently and uniformly controlled. This is because the range of the temperature under which the artificial turf is, may be controlled by the solar reflectivity.

For example, the minimum rate may be determined for an ambient temperature between min1 and max1 regardless of the shape of the microporous zeolite mineral. If the artificial turf is to be implemented in a region having an ambient temperature between min2 and max2, the shape of the microporous zeolite mineral may be chosen such that the temperature at the surface of the turf is between min1 and max1.

According to one embodiment, the artificial turf infill is the microporous zeolite mineral. The microporous zeolite mineral is the only infill material. This may provide safe and environmental friendly artificial turfs.

According to one embodiment, the porosity of the zeolite ore is between 15% to 20%, wherein the maximum specific surface area is between 20 $m^2/g$ and 35 $m^2/g$. In a preferred embodiment the maximum specific surface area is between 15 $m^2/g$ and 25 $m^2/g$. In a very preferred embodiment the maximum specific surface area is between 19 $m^2/g$ and 21 $m^2/g$. For example, the selected specific surface area may be 20 $m^2/g$ the microporous zeolite mineral having a porosity of 20%.

According to one embodiment, the ambient temperature is between 40° F. and 60° F. or below 100° F. "Ambient temperature" refers to a temperature of the air that surrounds the artificial turf under circumstances without any special heating and cooling. For example, the minimum rate may be determined using the usage time of the artificial turf. For a playing field, the minimum rate may be determined based on the game duration time e.g. such that the water progressively releases during the entire game.

According to one embodiment, the method further comprises: determining the maximum specific surface area such that in the presence of humidity, the mineral absorbs the humidity.

The humidity absorption refers to the moisture buffering capacity of the microporous zeolite mineral. This embodiment may prevent, for example, in the cold season the appearance of frost which renders the surfaces hard and slippery and thus dangerous to use.

According to one embodiment, the microporous zeolite mineral has a grain size between 0.5 mm and 1.2 mm or between 0.9 mm and 1.2 mm. The selected size may have the further advantage of protecting the users of the artificial turf by reducing the risk of skin injury when the users are in contact the infill material. This may also prevent a slippery surface of the artificial turf.

According to one embodiment, 0.6% of the mineral is not retainable on a 100 mesh screen. This may provide another means (e.g. in combination with the drying) for further controlling the amount of dust in the resulting microporous zeolite mineral.

According to one embodiment, the microporous zeolite mineral has a hardness between 3 and 4 on the Mohs scale. This may provide a soft and resilient playing surface. This may reduce the risk of injuries (e.g. skin abrasion). Another advantage may be that the present infill material by reducing the wear effect of synthetic turf fibers caused by the friction between the zeolite mineral and the fibers.

For example, the amount of arsenic in the microporous zeolite mineral is below 4 mg per kg of the mineral. This may provide a healthy material.

In some embodiments, a method for controlling the temperature on an artificial turf is provided. The method comprises providing a microporous zeolite mineral having a selected specific surface area of the mineral; and using the microporous zeolite mineral as an infill material of the artificial turf.

According to one embodiment, the microporous zeolite mineral has a color with a predefined brightness, wherein the specific surface area of the mineral being selected based on the predefined brightness. The color may for example be white and the brightness may be equal to 85. This provides an additional parameter for an optimal control of the temperature at the surface of the artificial turf. The determination of the specific surface area may be modulated or combined with the brightness by balancing between the two parameters values in order to obtain the minimum rate.

In some embodiments, an artificial turf is provided. The artificial turf comprises an artificial turf carpet with a pile and artificial turf infill, wherein the artificial turf carpet comprises a backing; wherein the artificial turf carpet further comprises artificial grass fibers, wherein the artificial grass fibers are tufted into the backing, wherein the artificial grass fibers form the pile, wherein the artificial grass fibers are secured to the backing, wherein the artificial turf infill comprises a microporous zeolite mineral having a selected specific surface area of the mineral.

According to one embodiment, the artificial turf further comprises a sprinkler system. The use of a sprinkler system with the artificial turf may be beneficial because it may be used to automatically wet the artificial turf infill. For example this may be a convenient means of watering the artificial turf during a time period that is defined based on the minimum release rate of the water from the microporous zeolite mineral. For example, the selected microporous mineral may have a specific surface area which enables the water to progressively release during the half time period of a football game. In this case, the sprinkler system may be configured to water the artificial turf during the half-time break of the game.

In some embodiments, an artificial turf infill material is provided. The artificial turf infill material comprises a microporous zeolite mineral having a selected gain size smaller than 1.5 mm and a porosity between 15% and 20%.

According to one embodiment, the microporous zeolite mineral has a grain size distribution as follows: 70% to 90% of the grains have a size in the range [0.4 mm, 1.5 mm] and 10% to 30% of the grains have a size smaller than 0.4 mm. In another example, the microporous zeolite mineral has a grain size distribution as follows: 70% to 90% (e.g. 88%) of the grains of the microporous zeolite mineral have a size in the range [0.42 mm, 1.41 mm] (14-40 mesh) and 10% to 30% (e.g. 12%) of the grains of microporous zeolite mineral have a size smaller than 0.42 mm. The selected sizes may enable to obtain the selected specific surface area.

According to one embodiment, 0.6% of the mineral at most is not retainable on a 100 mesh screen.

According to one embodiment, the microporous zeolite mineral has a hardness between 3 and 4 on the Mohs scale.

The infill material of any of the preceding claims 22-25, wherein the moisture level in the mineral is smaller than 6%

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which:

FIG. 4B illustrates a further example of an artificial turf;

FIG. 4C illustrates a further example of an artificial turf; and

DETAILED DESCRIPTION

Like numbered elements in these figures are either equivalent elements or perform the same function. Elements which have been discussed previously will not necessarily be discussed in later figures if the function is equivalent.

Figure 1:
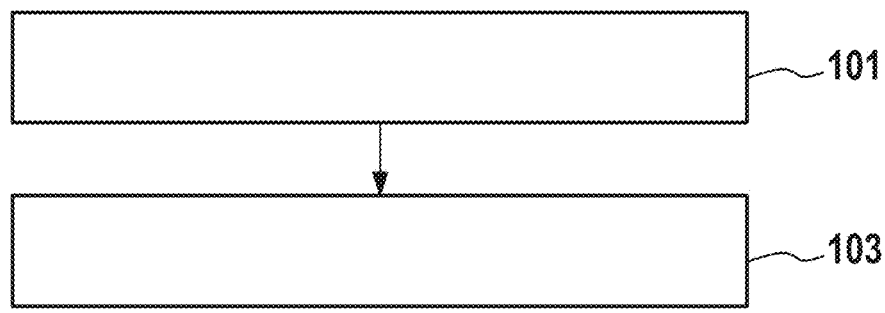
FIG. 1 is a flowchart of a method for forming an artificial turf infill material

FIG. 1 is a flowchart of a method for forming an artificial turf infill material. The infill material may be included in artificial turfs as described with reference to FIGS. 4A-5.

In step 101, a zeolite ore may be provided. The zeolite ore is a naturally occurring solid material. The zeolite ore has a porosity between of 15% and 20%. The term "porosity" refers to the volume fraction of void space in a porous article. The zeolite phase of the zeolite ore may comprise one or more of the group consisting of clinoptilolite, mordenite, or other naturally occurring zeolite minerals.

The zeolite ore may be provided for example as follows. A zeolite deposit is stripped of overburden and stockpiled for use in subsequent mine reclamation. The resulting exposed ore body is drilled to depths between 12 and 14 feet. The drill holes are loaded with an explosive charge that degenerates upon use, leaving no residue in the zeolite ore. From the mine pit, the zeolite ore is hauled by dump truck to the crude ore stockpile at a processing mill.

In step 103, a microporous zeolite mineral may be selected from the zeolite ore. The selection may be performed using a selection criterion involving the specific surface area of the mineral. The selection criterion may refer to one or more rules on the specific surface area. The selected microporous zeolite mineral has for example a porosity between 15% and 20%.

For example, the selection of step 103 comprises a selective recovering or obtaining of the microporous zeolite mineral having a predefined specific surface area from the zeolite ore. The specific surface area constitutes an important criterion that is involved in the determination of the quality of a zeolite mineral since the nature of the specific surface area enables a decisive characteristic for the overall usage of zeolite in numerous technical components and products. For example, a specific surface area which is too high may render the release of water under ambient temperature very slow or inexistent.

In one example, the selection criterion requires that the specific surface area is smaller than a predetermined maximum specific surface area. The maximum specific surface area of the mineral may for example be determined as the surface specific area that enables the water in the mineral to release, under an ambient temperature, at a predefined minimum rate. For example, for a specific surface area equal or higher than 40 $m^2/g$ the water may only release under temperatures which are higher than the maximum ambient temperatures. Those high temperatures require the use of an oven. The present method may be advantageous as the maximum surface specific area that is selected enables the water to release under ambient temperatures e.g. between 40° and 60° F. The selected specific surface area may for example be 20 $m^2/g$ for a porosity of 15% to 20%.

In another example, the maximum specific surface area is chosen such that at most 0.6% of the mineral is not retainable on a 100 mesh screen e.g. 94% of the mineral has a grain size higher than 0.15 mm. This may have the advantage of reducing the amount of dust in addition to enabling a progressive release of the water for an optimal cooling of the artificial turf. Reducing the amount of dust may be beneficial for improving the safety of the product as regards the protection of the respiratory system of users of the artificial turf.

The selected microporous zeolite mineral may be used as the artificial infill material. In on example, the artificial infill material may consist of the selected microporous zeolite mineral. In another example, the artificial infill material may comprise the selected microporous zeolite mineral in addition to other infill materials.

Figure 2:
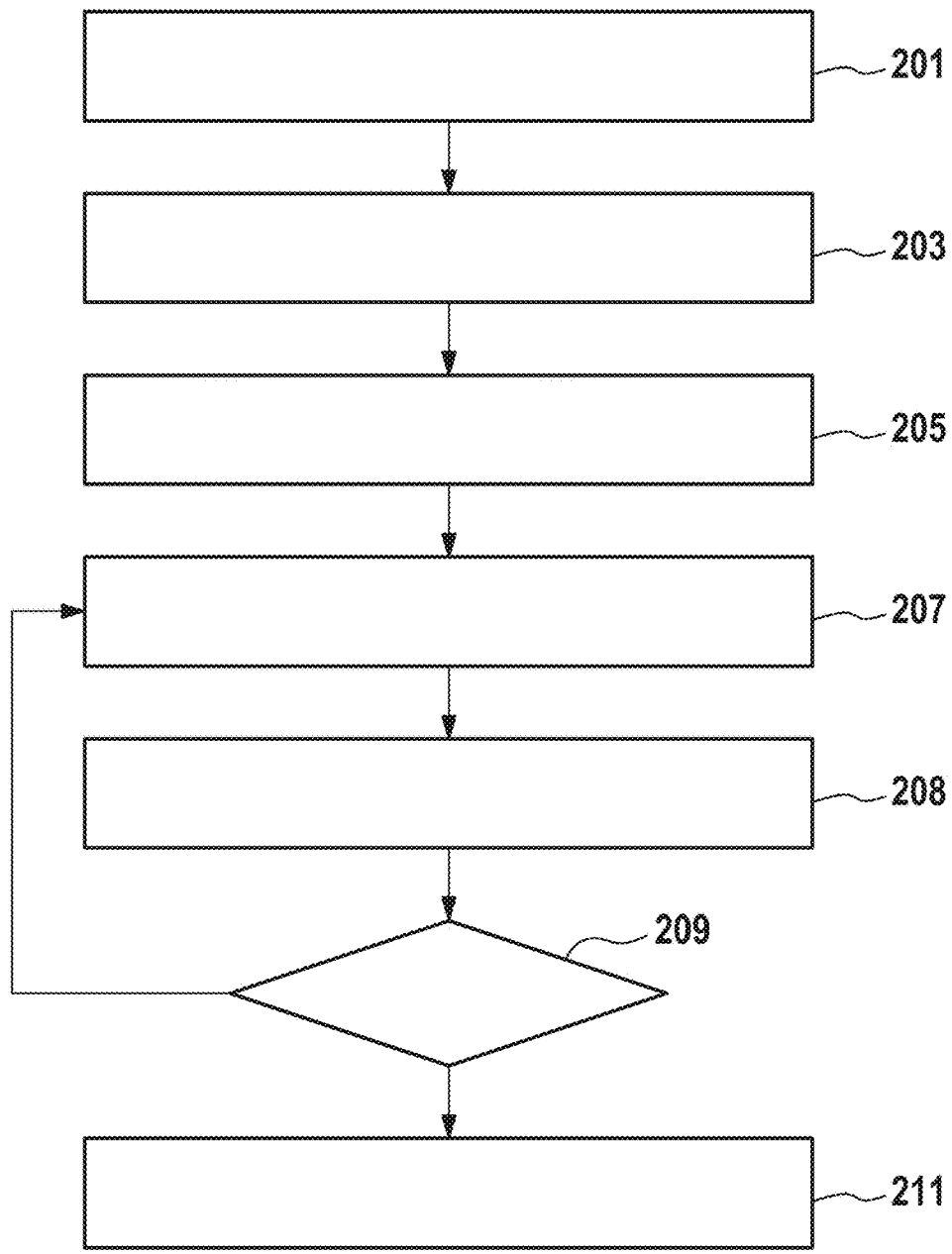
FIG. 2 is a flowchart of an example method for selecting a microporous zeolite mineral from the zeolite ore.

FIG. 2 is a flowchart of an example method for selecting a microporous zeolite mineral from the zeolite ore (e.g. the zeolite ore provided in step 101) using a grinding unit. The grinding unit is configured for performing the grinding and screening of zeolite materials. The grinding unit may have parameters for controlling its function. The parameters may for example comprise the reduction ratio of the grinding unit, the number of times the screening is to be repeated in the screening step; the exciting force causing the vibration of the screening unit; inclined and/or horizontal screening.

In step 201, a zeolite grain size that corresponds to the maximum surface specific area may be determined. The grain size of the microporous zeolite mineral is determined such that the resulting specific surface area of the mineral is smaller than the maximum specific surface area.

Naturally, the specific surface area of the microporous zeolite mineral varies with its structure. For example, the finer the mineral is, the larger the specific surface area is (i.e. the smaller the grain size is, the larger the specific surface area is).

For example, the specific surface area of the microporous zeolite mineral may not exceed a minimum specific surface area. The minimum specific surface area may be the smallest possible specific surface area. In this case, the determined grain size may be the lower limit of a range of sizes, wherein the upper limit of the range may be determined using the minimum specific surface area. The microporous zeolite mineral may for example have a grain size between 0.5 mm and 1.2 mm or between 0.9 mm and 1.2 mm, for a maximum surface specific surface area of 21 $m^2/g$ (e.g. the selected specific surface area may be 20 $m^2/g$).

Figure 3:
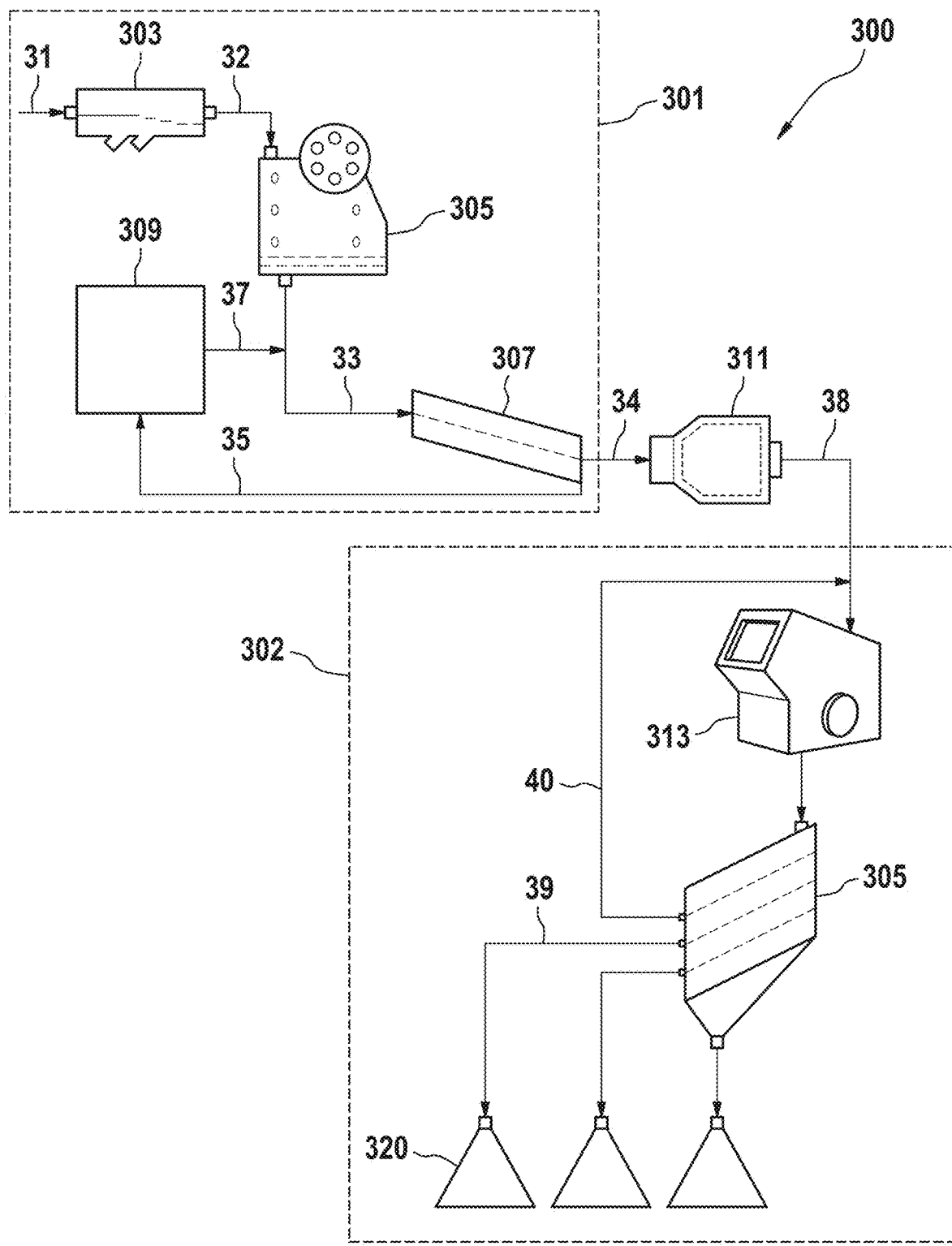
FIG. 3 is a flowchart of another example method for selecting a microporous zeolite mineral from the zeolite ore.

In step 203, the zeolite ore may be reduced into smaller zeolite fractions. FIG. 3 shows an example method for reducing the zeolite ore into smaller fractions. The zeolite fractions may for example have a maximum size of ⅝ inch. In order to obtain that maximum size for the fractions, the reducing of the zeolite ore may comprise in addition to crushing the zeolite ore, a sieving or screening step, wherein in the screening step the crushed zeolite ores are screened with series of sieves. For example, the series of sieves may comprise sieves having sieve sizes ranging from about a minus 14 mesh (1.41 mm) to about a plus 40 mesh (0.42 mm).

In step 205, parameters of the grinding unit may be set in accordance with the determined grain size of step 201. For example, the reduction ratio of the grinding unit may be set such that the grinding unit may provide or output from the zeolite fractions grains having as a maximum size the determined grain size.

In one example, before performing the grinding step 207, the zeolite fractions resulting from step 203 may be dried in a dryer. This may have the advantage of reducing the amount of dust in the resulting microporous zeolite mineral.

In step 207, the zeolite fractions may be grind in the grinding unit. The term "grinding" encompasses processes like cutting, chopping, crushing, milling, pulverizing, and the like.

After grinding the zeolite fractions, the resulting zeolite material may be screened in step 208, resulting in groups of zeolite grains, wherein each group has a respective minimum grain size. The screening may for example be performed using series of sieves having sieve sizes ranging from about a minus 14 mesh (1.41 mm) to about a plus 40 mesh (0.42 mm). The screening may be a vibratory-type screening.

In one example, up to six or more different fractions can be separated in one screening process. This may for example be done using multiple sieve decks positioned on top of each other in a classification range such as a range of 0.1 mm to 1.5 mm.

The maximum grain size of each group of the groups may be compared with the determined grain size of step 201. In case (inquiry 209) the minimum grain size of a group of the groups is higher than the determined grain size, step 208 or steps 207-208 may be repeated. Otherwise, the group may be selected and stored in step 211 as part of the selected microporous zeolite mineral.

For example, the method may end if the selected microporous zeolite mineral reaches a predefined amount or if the input ore is completed.

FIG. 3 illustrates the process of selecting a microporous zeolite mineral from a zeolite ore (e.g. zeolite ore of step 101) in accordance with another example of the present disclosure. FIG. 3 shows a crushing unit 301 and a grinding unit 302, wherein the zeolite ore is first processed at the crushing unit 301 and the resulting material is input to the grinding unit 302 for further processing.

Before processing the zeolite ore in the crushing unit 301, the zeolite ore may for example be obtained as follows. A zeolite deposit is stripped of overburden and stockpiled for use in subsequent mine reclamation. The resulting exposed ore body is drilled to depths between 12 and 14 feet. The drill holes are loaded with an explosive charge that degenerates upon use, leaving no residue in the zeolite ore. From the mine pit, the zeolite ore is hauled by dump truck to the crude ore stockpile at a processing mill.

The zeolite ore is fed in step 31 through a grizzly 303 with 16"×16" opening, the output ore of the grizzly 303 travels in step 32 via a first conveyer into a jaw crusher 305 where the output ore of the grizzly 303 is reduced to a 4 inch size resulting in 4 inch ore. The 4 inch ore travels in step 33 via a second conveyor to a double deck Nordberg screen 307 with a ⅝ inch screen on the top deck. The resulting output of the double deck Nordberg screen 307 is a minus ⅝ inch material and plus ⅝ inch material.

The minus ⅝ inch material travels in step 34 to a third conveyor toward the grinding unit 302 via a dryer 311. The plus ⅝ inch material travels back in step 35 via a fourth conveyor to a cone crusher 309 which reduces the plus ⅝ inch material to at least ½ inch material. The ½ inch material then returns in step 37 to the Nordberg screen 307 via the second conveyor.

From the third conveyor, the zeolite material output of the Nordberg screen 307 travels in step 34 to a propane fueled rotary kiln dryer 311 where it is heated at 250° C., reducing moisture to 5%, and fed in step 38 to the grinding unit 302.

The zeolite material is conveyed in step 38 from the dryer 311 via a fifth conveyor to an impact crusher 313 and five-decked Midwestern screens 315. From the screens 315 the zeolite is sized and conveyed in step 39 to a sixth conveyor for packaging e.g. in super sacks 320 ready to ship or the zeolite is returned in step 40 via a seventh conveyor to the impact crusher 313 and which is returned to the Midwestern Screens 315. At the Midwestern screens 315, the products are sized according to customer specifications and either sent to finished product handling.

In the finished product handling process: a. the material is either sent to bulk storage silos for direct truck loading or b. The material is sent to packaging silos where it is packaged in customer specified bags and palletized, wrapped, and stored in warehouse for truck pick up.

The following table gives example properties of the selected microporous zeolite mineral of the present method.

| Parameter | Values |
|---|---|
| Granulometry | 14 × 40 mesh (0.42-1.39 mm) |
| Particle size distribution | |
| 14 mesh (1.39 mm) | 0.9% |
| 20 mesh (0.84 mm) | 39.0% |
| 30 mesh (0.59 mm) | 27.0% |
| 40 mesh (0.42 mm) | 21.0% |
| 100 mesh (0.15 mm) | 10.0% |
| <100 mesh | 0.6% |
| color/Brightness | White/85 |
| Hardness | 3 |
| Porosity | 15-20% |
| Arsenic total | <4 mg/kg sec |
| Level of humidity | ≤6% |

The values of the parameters, particle size or grain size, color, hardness, arsenic total and level of humidity, listed in the table are central values. However, each parameter of these parameters may have a value in the range defined by the central value, ±10%, ±5% or ±3% of the central value. These values may for example enable to obtain a specific surface area of 20 m²/g.

Figure 4A:
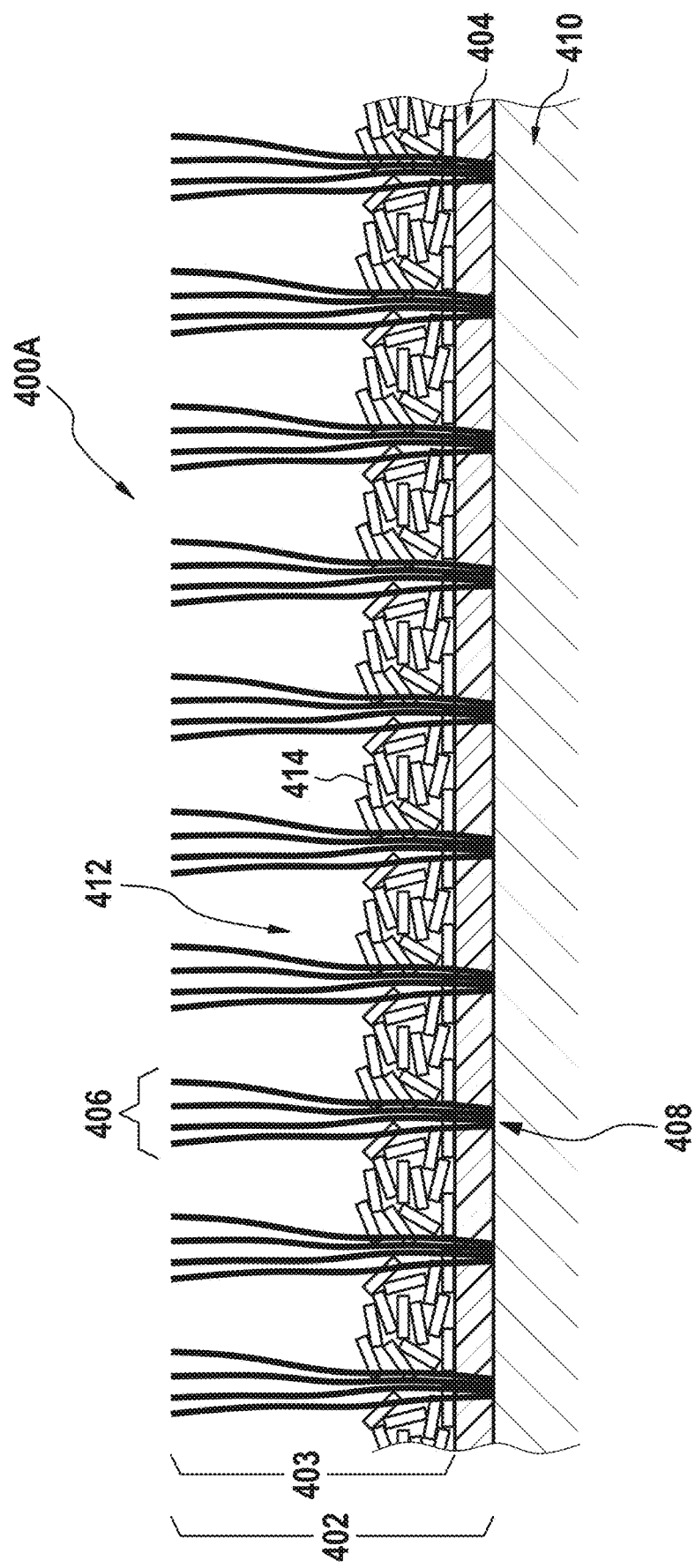
FIG. 4A illustrates an example of an artificial turf.

FIG. 4A shows an example of an artificial turf 400A. The artificial turf 400A comprises an artificial turf carpet 402. The artificial turf carpet comprises a backing 404 and also artificial grass fibers 406. The artificial grass fibers 406 are tufted into the backing 404 and are secured 408 to the backing 404. The artificial turf fibers 406 form a pile 403. The artificial turf carpet 402 is resting on a ground 410 or surface. Between and distributed between the artificial grass fibers 406 and within the pile 403 is an artificial turf infill 412. The infill artificial turf infill 412 is shown as having a cylindrical shape; however it may have other shapes. For example, the shape of the microporous zeolite mineral may be a spherical shape. In this example the artificial turf infill 412 is made from at least the selected microporous zeolite mineral 414. In on example, the artificial infill material may consist of the selected microporous zeolite mineral. In another example, the artificial infill material may comprise the selected microporous zeolite mineral in addition to other infill materials.

FIG. 4B shows a further example of an artificial turf 400B. The artificial turf 400B is similar to the artificial turf 400A shown in FIG. 4A except there is additionally a sand layer 420 between the artificial turf infill 412 and the backing 404. The use of the sand layer 420 may be advantageous because it may help to hold the artificial turf carpet 402 in place. It may also have the technical benefit that the sand layer 430 works in conjunction with the artificial turf infill 412 to regulate the amount of water on the surface of the artificial turf 400B. For example if it rains or if water is sprayed onto the surface of the artificial turf 400B the composite infill components 414 may rapidly absorb and saturate with water. The sand layer 420 may then aid in draining away excess water and preventing it from standing on the surface of the artificial turf 400B.

FIG. 4C shows a further example of an artificial turf 400C. The artificial turf 400C is similar to the artificial turf 400B shown in FIG. 4B with the addition of several additional layers. Directly underneath the backing 404 is an elastic layer 432. The elastic layer 432 may for example be a mat or other material such as sand and elastomeric granulate or a mixture thereof that readily absorbs shock. The elastic layer 432 is optional. The backing 404 and/or the elastic layer 432 may have holes or may be porous so that water that is standing on the artificial turf 400C can be drained away. The elastic layer 432 is directly sitting on a drainage system 430. The drainage system 430 may comprise granulate material, drainage tiles, drainage pipes or other system for rapidly draining water off the surface of the artificial turf 400C. The artificial turf depicted in FIG. 4C may have superior qualities when water is used to cool or improve sliding properties. Water that initially goes on the surface may readily be absorbed by the composite infill components 414 that make up the artificial turf infill 412. When they have filled with water excess water may then go into and possibly be stored in the sand layer 420. When the sand layer 420 is saturated it may drain through the backing 404 and/or the elastic layer 432 into the drainage system 430.

Figure 5:
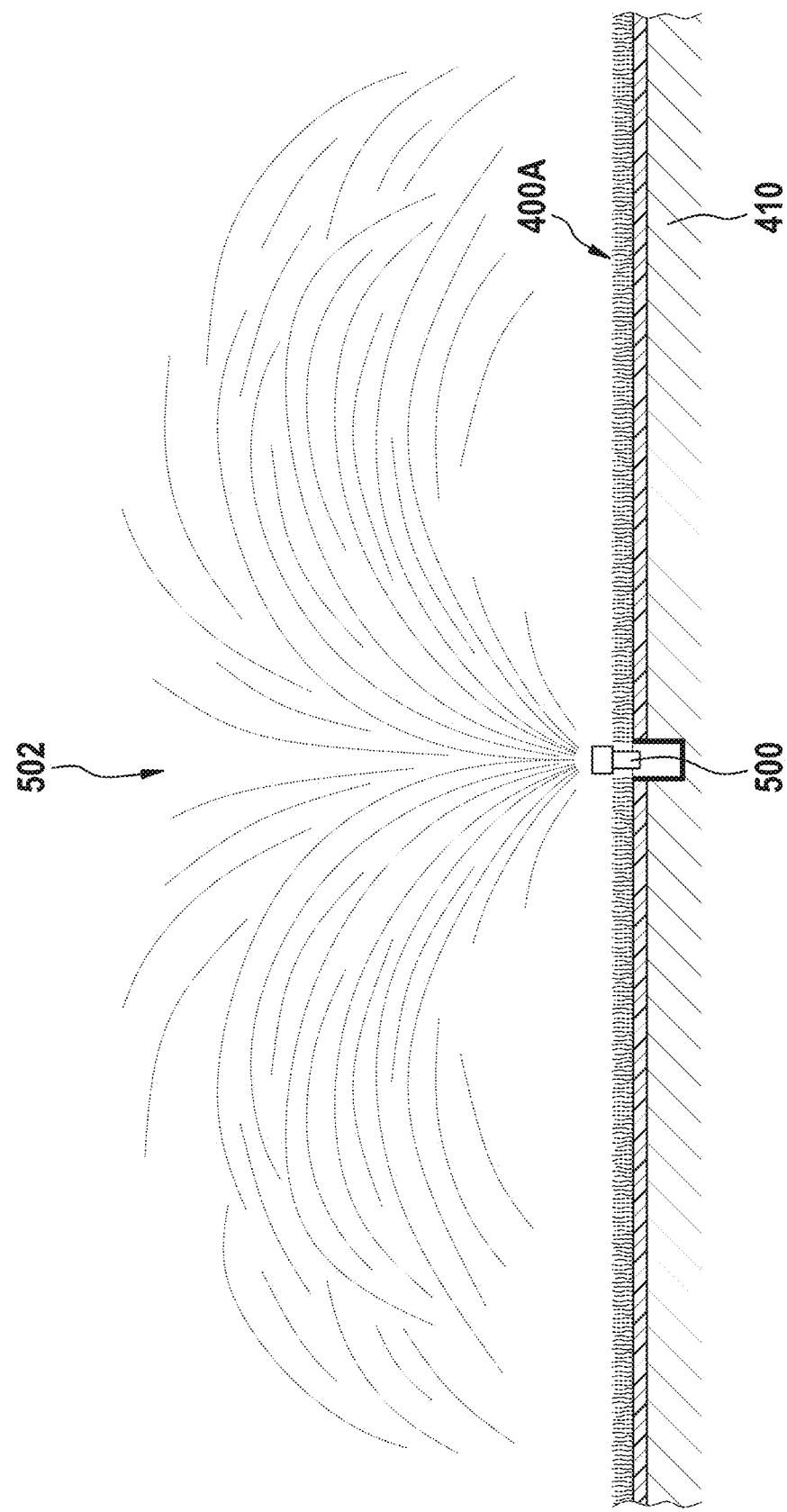
FIG. 5 illustrates an example of an artificial turf which incorporates a sprinkler system.

FIG. 5 shows a further example of the artificial turf e.g. 400A. In this example an automatic sprinkler system 500 has been integrated into the artificial turf 400A. The sprinkler 500 is depicted as spraying water 502 on an upper surface of the artificial turf 400A. The use of the sprinkler may be beneficial in combination with the artificial turf as it may provide an integrated watering system for an optimal watering of the artificial turf.

LIST OF REFERENCE NUMERALS 31-40 method steps
101-103 method steps
201-211 method steps
301 crushing unit
302 grinding unit
303 grizzly
305 jaw crusher
307 Nordberg screen
309 cone crusher
311 dryer
313 impact crusher
315 Midwestern screens
320 sack
400A artificial turf
402 artificial turf carpet
403 pile
404 backing
406 artificial grass fibers
408 secured to backing
410 ground
412 artificial turf infill
414 composite infill component
400B artificial turf
420 sand layer
400C artificial turf infill
432 elastic layer 430 drainage system
500 sprinkler system
502 spraying water.

The invention claimed is:

1. A method for forming an artificial turf infill material, the method comprising:
   providing a zeolite ore;
   reducing the zeolite ore into first zeolite fractions; and
   selecting from the first zeolite fractions a microporous zeolite mineral for providing the artificial turf infill material to an artificial turf,
   such that the selection is performed based on selecting a shape of the microporous zeolite mineral such that a temperature at the surface of the artificial turf is between min1 and max1 when the artificial turf is implemented in a region having an ambient temperature between min2 and max2.

2. The method of claim 1, the selecting comprising:
   providing a grinding unit;
   grinding the first zeolite fractions using the grinding unit for reducing the first zeolite fractions into second zeolite fractions; and
   wherein the method further comprises,
     repeatedly grinding the first zeolite fractions and screening the second zeolite fractions in the grinding unit for selecting the microporous zeolite mineral.

3. The method of claim 2, wherein the first zeolite fractions have a maximum size of ⅝ inch.

4. The method of claim 2, the reducing of the zeolite ore comprising crushing the zeolite ore into the first zeolite fractions in a primary crusher, wherein the grinding unit comprises a secondary crusher and a screening unit.

5. The method of claim 2, further comprising drying the first zeolite fractions in a dryer before the grinding.

6. The method of claim 1, wherein a porosity of the zeolite ore is between 15% to 20%, wherein a maximum specific surface area of the microporous zeolite mineral is 35 $m^2/g$ or less.

7. The method of claim 1, wherein the ambient temperature is between 40° F. and 100° F.

8. The method of claim 1, the method further comprising:
   determining a maximum specific surface area of the microporous zeolite mineral such that in the presence of humidity, the mineral absorbs the humidity to a level of ≤6%.

9. The method of claim 1, wherein 0.6% of the mineral at most is not retainable on a 100 mesh screen.

10. The method of claim 1, the microporous zeolite mineral having a hardness between 3 and 4 on the Mohs scale.

11. The method of claim 1, wherein the microporous zeolite mineral has a grain size between 0.5 mm and 1.2 mm and/or the porosity of the zeolite ore is between 15% and 20%.

12. The method of claim 1, wherein the microporous zeolite mineral has a grain size distribution as follows: 70% to 90% of the grains have a size in the range 0.4 mm to 1.5 mm and 10% to 30% of the grains have a size smaller than 0.4 mm, wherein a moisture level in the microporous zeolite mineral is smaller than 6%.

13. The method of claim 1, wherein the selection is further performed based on selecting the microporous zeolite mineral having a specific surface area less than a maximum specific surface area.

* * * * *